United States Patent
Weingartner (10) Patent No.: US 8,157,246 B2
(45) Date of Patent: *Apr. 17, 2012

(54) DEFLECTING ROLLER WITH INCREASED CHAIN UTILIZATION

(75) Inventor: Jurgen Weingartner, Kocherstetten (DE)

(73) Assignee: Konecranes Plc, Hyvinkaa (FI)

( * ) Notice: Subject to any disclaimer, the term of this patent is extended or adjusted under 35 U.S.C. 154(b) by 518 days.

This patent is subject to a terminal disclaimer.

(21) Appl. No.: 12/376,091

(22) PCT Filed: May 25, 2007

(86) PCT No.: PCT/EP2007/004680
§ 371 (c)(1),
(2), (4) Date: Jul. 1, 2009

(87) PCT Pub. No.: WO2008/014836
PCT Pub. Date: Feb. 7, 2008

(65) Prior Publication Data
US 2009/0309083 A1    Dec. 17, 2009

(30) Foreign Application Priority Data
Aug. 1, 2006 (DE) .......................... 10 2006 036 163

(51) Int. Cl.
*B66D 1/20*    (2006.01)
(52) U.S. Cl. ........ 254/372; 474/152; 474/154; 474/155; 474/164; 474/206
(58) Field of Classification Search ................... 254/358, 254/372; 474/152, 155, 164, 154, 206
See application file for complete search history.

(56) References Cited

U.S. PATENT DOCUMENTS

| 3,266,331 A | 8/1966 | Burrows |
| 3,376,756 A | 4/1968 | Yasue |
| 4,343,614 A * | 8/1982 | Schulte .......................... 474/155 |
| 4,473,364 A * | 9/1984 | Roling .......................... 474/164 |

(Continued)

FOREIGN PATENT DOCUMENTS

DD    244609 A1    4/1987

(Continued)

OTHER PUBLICATIONS

First Office Action in corresponding Chinese Application No. 200780028748.0, dated Mar. 22, 2011.

*Primary Examiner* — Emmanu M Marcelo
(74) *Attorney, Agent, or Firm* — Leydig, Voit & Mayer, Ltd.

(57) ABSTRACT

A deflecting roller for link chains, for example, round link chains or profiled steel chains, presents, on the periphery, chain pockets for lying chain links. Furthermore, chain pockets for standing chain links are provided. The chain pockets for the standing chain links are separated from each other by teeth. The tooth flank surfaces of the teeth, against which a standing chain link bears under the action of a load, are dimensioned and profiled in a specific way. The dimensioning is carried out so that, up to a certain chain loading, the standing chain link does not bear with its nose against the tooth flank. A contact between the tooth flank surface and the nose of the standing chain link concerned occurs only starting at a certain chain loading.

29 Claims, 8 Drawing Sheets

U.S. PATENT DOCUMENTS

| | | | |
|---|---|---|---|
| 4,501,577 A * | 2/1985 | Roling et al. | 474/155 |
| 4,850,942 A | 7/1989 | Dalferth | |
| 5,275,379 A * | 1/1994 | McAleer | 254/372 |
| 7,284,745 B2 * | 10/2007 | Keane et al. | 254/372 |
| 8,038,558 B2 * | 10/2011 | Klabisch et al. | 474/155 |
| 2005/0170924 A1 * | 8/2005 | Meya et al. | 474/155 |
| 2007/0042850 A1 * | 2/2007 | Klabisch et al. | 474/206 |
| 2009/0309083 A1 * | 12/2009 | Weingartner | 254/358 |
| 2010/0016107 A1 * | 1/2010 | Klabisch et al. | 474/155 |

FOREIGN PATENT DOCUMENTS

| | | |
|---|---|---|
| DE | 1273915 B | 7/1968 |
| DE | 1425974 A1 | 2/1969 |
| DE | 3201210 A1 | 7/1983 |
| DE | 8631190 U1 | 2/1987 |
| DE | 4130073 A1 | 3/1993 |
| EP | 0269557 A | 6/1988 |
| GB | 648940 A | 1/1951 |

* cited by examiner

| Wire thickness | Link width | Radius Outer contour | Link length | Tooth height 0.6 d | Radius Tooth flank | Radius tooth flank as a multiple of the wire thickness | Bearing angle in degrees | Starting point Tooth radius | Pocket number Chain sprocket Defecting roller | Slit width at ½" d |
|---|---|---|---|---|---|---|---|---|---|---|
| 4 | 13.6 | 6.8 | 19.80 | 2.4 | 7.06 | 0.26 | 45.00 | 3.10 | 4 | 0.0781 |
| 4.8 | 16.2 | 8.1 | 21.68 | 2.88 | 8.41 | 0.22 | 54.00 | 2.83 | 5 | 0.1306 |
| 5 | 17 | 8.5 | 25.75 | 3 | 8.82 | 0.21 | 54.00 | 4.38 | 5 | 0.1371 |
| 6 | 20.3 | 10.15 | 30.30 | 3.6 | 10.54 | 0.17 | 54.00 | 5.00 | 5 | 0.1637 |
| 6.8 | 23 | 11.5 | 31.06 | 4.08 | 11.94 | 0.15 | 54.00 | 4.03 | 5 | 0.1855 |
| 7 | 24.2 | 12.1 | 35.55 | 4.2 | 12.56 | 0.15 | 54.00 | 5.68 | 5 | 0.1952 |
| 9 | 30.4 | 15.2 | 44.55 | 5.4 | 15.78 | 0.12 | 45.00 | 7.08 | 4 | 0.1746 |
| 11.3 | 36.6 | 18.3 | 53.24 | 6.78 | 19.00 | 0.09 | 54.00 | 8.32 | 5 | 0.2952 |
| 6.3 | 20.95 | 10.475 | 31.14 | 3.78 | 10.87 | 0.16 | 54.00 | 5.09 | 5 | 0.1690 |
| 6.3 | 21 | 10.5 | 31.24 | 3.78 | 10.90 | 0.16 | 54.00 | 5.12 | 5 | 0.1694 |
| 6.45 | 21.4 | 10.7 | 31.08 | 3.87 | 11.11 | 0.16 | 54.00 | 4.84 | 5 | 0.1726 |
| 6.3 | 21.45 | 10.725 | 30.99 | 3.78 | 11.13 | 0.16 | 54.00 | 4.77 | 5 | 0.1730 |
| 7.1 | 23.5 | 11.75 | 34.25 | 4.26 | 12.20 | 0.15 | 54.00 | 5.37 | 5 | 0.1895 |
| 7.8 | 25.7 | 12.85 | 35.81 | 4.68 | 13.34 | 0.13 | 54.00 | 5.06 | 5 | 0.2073 |
| 7.9 | 26 | 13 | 37.11 | 4.74 | 13.49 | 0.13 | 54.00 | 5.55 | 5 | 0.2097 |
| 7.9 | 26.15 | 13.075 | 37.01 | 4.74 | 13.57 | 0.13 | 54.00 | 5.43 | 5 | 0.2109 |
| 7.95 | 26.3 | 13.15 | 39.60 | 4.77 | 13.65 | 0.13 | 54.00 | 6.65 | 5 | 0.2121 |
| 9.95 | 33 | 16.5 | 49.35 | 5.97 | 17.13 | 0.10 | 54.00 | 8.18 | 5 | 0.2661 |
| 11.1 | 35.7 | 17.85 | 52.10 | 6.66 | 18.53 | 0.09 | 54.00 | 8.20 | 5 | 0.2879 |
| 12.45 | 41.1 | 20.55 | 62.78 | 7.47 | 21.33 | 0.08 | 54.00 | 10.84 | 5 | 0.3315 |

Figure 8

DEFLECTING ROLLER WITH INCREASED CHAIN UTILIZATION

CROSS-REFERENCE TO RELATED APPLICATION

This patent application is the national phase of PCT/EP2007/004680, filed May 25, 2007, which claims the benefit of German Patent Application No. DE 10 2006 036 163.6, filed Aug. 1, 2006.

FIELD OF THE INVENTION

The present invention relates generally to a deflecting roller for deflecting link chains.

BACKGROUND OF THE INVENTION

So-called round link chains consist of concatenated individual round links. In each case, adjacent chain links are rotated with respect to each other about the longitudinal axis of the chain by 90°. Each chain link of a round link chain consists of a bent wire section, whose free ends are stub welded to each other.

In a top view onto the flat side, the chain link consists of two straight, mutually parallel sections, both transitioning at each end into semicircular arcs. The radius of the two semicircular arcs corresponds to the center separation of the straight sections The projection of such a flat lying chain link of a round link chain on a plane parallel to the flat side of the chain link is delimited by two lines, of which one is an outer line and the other is an inner line. The outer line is consequently composed of two straight sections that are mutually parallel, and two semicircular arcs, whose diameters correspond to the separation of the straight sections. The inner line extends at all locations at the same separation from the outer line, in accordance with the wire diameter.

Such round link chains are used for moving workpieces or carriers. The carriers can be, for example, pallets that are transported along a conveyance path. The chains also can be used as a load receiving mechanism of a so-called chain hoist. In the case of two-strand or multi-strand chain hoists, the chain must be guided over deflecting rollers. The deflecting rollers work in cooperation with the chain links with a positive connection. As the chain circulates over the deflecting roller, a distinction is made between standing or vertical chain links and lying or horizontal chain links. This distinction is made with respect to the deflecting roller. A lying or horizontal chain link denotes a link having one flat side that faces the rotational axis of the deflecting roller. A standing or vertical chain link is a chain link where the flat sides stand vertically on the rotational axis of the deflecting roller.

In conventional deflecting rollers known to date, only lying or horizontal chain links are used to establish a positive connection with the deflecting roller. Because of the unavoidable free play of the lying chain links, the standing chain link that is located on the running path of the chain about the deflecting roller at the vertex is considerably loaded in the process.

A chain sprocket is known from EP 0 269 557 to ensure the drive and that is adapted to the change of the chain pitch that results due to wear. During the circulation of the chain under a load over the chain sprocket, movement occurs between adjacent chain links. The movement occurs because the chain that has stretched under the load is forced by the deflecting roller in a circular track. The relative movement between the chain links causes friction wear with the consequence that the thickness of the chain link decreases at the corresponding locations. The thickness of the chain link is understood in the art to refer to the diameter of the wire at the particular location. Due to the change in the chain link thickness, the chain increases in length, i.e., its periodicity is no longer in agreement with the pitch of the deflecting roller. To take this into account, the chain pockets are shaped in a specific way for the standing or vertical chain links in known deflecting rollers.

The chain pockets for the standing or vertical chain links form a groove that runs in the peripheral direction of the chain sprocket, which groove passes through the chain pockets for the lying or horizontal chain links. The bottom of this groove describes, in the broadest sense, a regular n-gon, where n is equal to the number of chain pockets for the lying or horizontal chain links. The sides of this regular n-gon in each case are circular arc sections with a constant radius of curvature, which is very large compared to the radius of curvature of the outer line of the individual chain link. The pocket bottom has no change in curvature along its path. It merely transitions at the end into a rounded corner of the n-gon, at which the next pocket bottom for the adjacent chain pocket of a standing chain link starts. In the broadest sense, this corner can also be understood to be a tooth. The tooth tip is located at the middle, i.e., centered in the chain pocket for the lying or horizontal chain element. It ends considerably below a plane that is defined by the flat side of the chain link that is adjacent to the rotation axis.

FIG. 2 of the aforementioned EP 0 269 557 shows the ratio between the standing or vertical chain link and the associated chain pocket when employing a previously unused round link chain. The adjacently lying or horizontal chain links hold the standing or vertical chain link at a separation from the pocket bottom of the chain pocket for the corresponding standing chain link. It is only when the chain length increases due to wear that there is a slight cant of the standing chain link, with the consequence that the chain link bears with its nose that points in the loading direction against the pocket bottom. The tangent at the contact point between the pocket bottom and the outer line of the chain link runs at a very acute angle with respect to the longitudinal axis of the standing chain link, with the result that practically no force transmission is possible through the point-shaped contact location, from the deflecting roller to the round link chain or vice versa.

OBJECTS AND SUMMARY OF THE INVENTION

In view of the foregoing, a general object of the invention is to provide a deflecting roller that stresses the chains less and thus allows a higher loading of a link chain as compared to a prior art deflecting roller.

Applicants have discovered that greater loading/utilization of the chain is possible, if, during deflection the standing or vertical chain link is supported by the deflecting roller in the longitudinal direction, starting at a certain loading. To achieve this, the adjacent tooth flanks, against which the chain link bears with its nose under load, have to be configured in a specific way.

The deflecting roller of the present invention, like the deflecting roller from the state of the art, is intended for use with link chains, particularly round link chains or profiled steel chains of chain hoists. Each chain link of the link chain consists of a bent wire section, and it presents a planar shape. The shape is composed of two mutually parallel sections and two semicircular arcs.

The deflecting roller according to the invention includes a base body with an outer peripheral surface and a rotational axis that is centered with respect to the outer peripheral surface. The base body includes chain pockets, which are located on the external peripheral surface of the base body. The chain pockets are arranged for the purpose of receiving the lying chain links, so that the lying chain links are not bent during the deflection over the transverse or flat side.

The deflecting roller further contains chain pockets, which are also located on the external peripheral surface, and which are arranged so they receive standing chain links. The number of chain pockets for the standing chain links corresponds to the number of chain pockets for the lying chain links. Each chain pocket for the standing chain links has contact areas on which the respective chain link can bear at least with a part of its straight section that follows the circular arc. The chain pockets for the standing chain links in each case are arranged between adjacent chain pockets for lying chain links and overlap them.

Radial teeth protrude between adjacent chain pockets for standing chain links. The radial teeth are arranged so as to chamber the standing chain link in the longitudinal direction. Each of the teeth is delimited by two tooth flanks that point in the peripheral direction. Each tooth flank defines a tooth flank curvature line, which lies in the symmetry plane that passes through the chain pocket for the standing chain links and stands vertically on the axis or rotation. These symmetry planes coincide with the symmetry plane of the standing chain link. In this case, a flank surface denotes the plane that is in tangential contact with the chain links on the given flank.

The position of the tooth flank is adapted such that the tooth flank curvature line in the symmetry plane is separated from the outer line of the half circular arc that points in the loading direction and belongs to a chain link that is arranged in the chain pocket. This separation exists when the two adjacently lying chain links are centered and lie in their associated chain pockets without any effect of an external force.

Because of the separation between the tooth flank curvature line and the outer line of the semicircular arc, which both lie in the same plane that intersects the axis of rotation at a right angle, an arc-shaped curve and wedge-shaped slit is defined between the nose of the chain link and the adjacent tooth flank, with the width of the slit becoming larger in the direction toward the tooth tip. This slit is dimensioned so that it closes when the force action on the chain link exceeds a predetermined amount. This closing occurs due to an elastic deformation of the corresponding semicircular arc of the chain link.

To optimize support for the standing chain link, the tooth should have as large as possible a radial height. However, the radial height is limited by the fact that the tangential running off of the link chain from the deflecting roller must not be impeded. Advantageous conditions are achieved if the tooth presents a height between 0.16 times and 0.75 times the thickness of the chain link over a surface that is defined by the flank surface of the lying chain link, which surface is adjacent to the axis of rotation, and into which the tooth protrudes. As will be understood, the tooth height is dependent on the thickness of the wire used for the chain links.

A good support of the chain link by the tooth flank is achieved if the tooth flank is curved biaxially. As a result, an advantageous force distribution is achieved both in the tooth flank and also in the nose of the chain link because of the large bearing surface. In this instance, biaxially curved means a curvature whose associated center of curvature lies on a line that runs parallel to the tooth flank line of curvature at an appropriate separation distance. The radius of curvature, which is measured with respect to this line, is advantageously not smaller than half the diameter of the wire from which the chain link is manufactured.

The separation between the nose of the chain link and of the tooth flank or between the outer line and the tooth flank line curvature line can be approximated using two osculating circles. One of the osculating circles is an approximation of the outer line of the semicircular arc of a standing chain link placed in the deflecting roller. As a result, an osculating circle center is defined. The second circle approximates the tooth flank curvature line and thus defines an additional center. The center of the tooth flank osculating circle is shifted with respect to the center of the chain link osculating circle in the loading direction. The amount of the shift is again dependent on the wire thickness and length of the chain link. Advantageously, the centers of the two osculating circles lie on a straight line that runs parallel to the straight sections of the standing chain link. Depending on the type of chain link, a profile at an acute angle may also be advantageous.

The line of curvature of the tooth flank can be exactly circular, which simplifies the manufacture of the deflecting roller. The line of curvature of the tooth flank can also present the same profile as defined by the outer line when the chain link is under a certain load, for example, a nominal load. Upon closer inspection, the profile is then approximately parabolic, which, however, still means that here too an osculating circle can be defined over the section of the tooth flank's curvature line. The osculating circle is then defined as the circular line for which the separations from the tooth flank curvature line are at a minimum, i.e., the circular line is a regression line. The separations are measured here on the corresponding radii of the osculating circle.

To achieve long a useful life of the deflecting roller that is as long as possible, it is advantageous for the deflection roller to be made of a hardened, preferably case hardened, steel to obtain a certain resilience and adaptability, while the resistance to abrasion remains high.

It is advantageous for an axle bore to traverse the deflecting roller. This bore allows the deflecting roller to be put on a shaft/axle.

The chain pockets for the lying chain links can be designed in the shape of trays.

The chain pockets for the standing chain links can be delimited by the two mutually facing tooth flanks and a pocket bottom. The pocket bottom can also be curved, with the axis of curvature forming a right angle with the axis of rotation. Another possibility is to use a pocket bottom that is planar and transitions in its area abutting the tooth flanks into an appropriate curvature, as defined above.

To prevent excessive loading of the chain link in the area of the welding location, the pocket bottom can contain a recess for relieving the welding seam of the chain link.

The radius of the osculating circle of the line of curvature of the tooth flank can be equal to or greater than the radius of the osculating circle of the outer line of the semicircular arc. The position of the centers with respect to each other must be chosen so that the pocket bottom opens tangentially without buckling into the tooth flank. The ratio of the two radii in turn is dependent on the wire diameter or the size of the chain link and it can between the factor 1.0 and 1.2.

In order to improve the running of the standing chain link in and out of the tooth flank, the tooth flank transitions in the area of the tooth head preferably into a chamfered surface. This chamfered surface can be a curved or a flat surface. The height of the chamfer, measured in the radial direction of the tooth, can be 0.1-2 mm, preferably 0.2-1.5 mm.

The description of exemplary embodiments below is limited to an explanation of the essential aspects of the invention. It will be clear to those skilled in the art that a number of variations are possible. Additionally, minor details that are not described can be inferred by a person skilled in the art from the drawings, which in this respect complement the description provided below.

Other objects and advantages of the invention will become apparent upon reading the following detailed description and upon reference to the drawings, in which:

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF THE PREFERRED EMBODIMENTS

Figure 1:
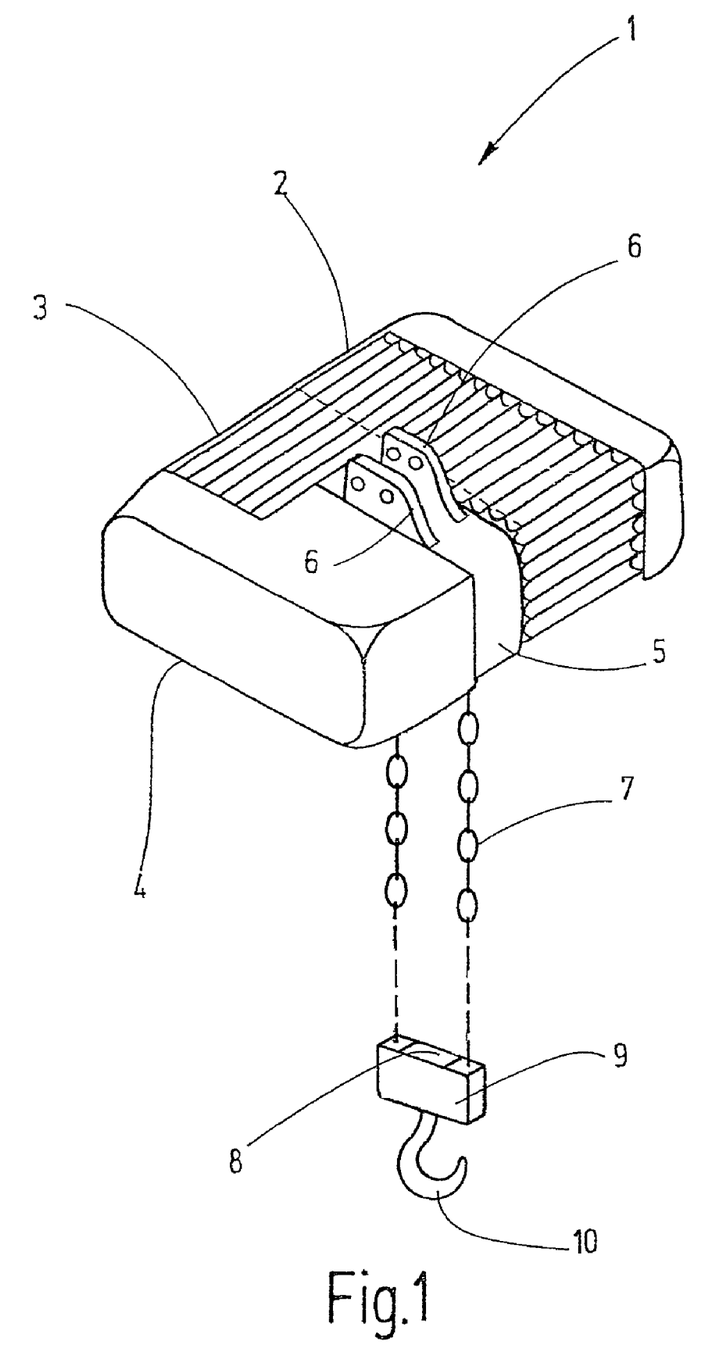
FIG. 1 is a schematic perspective view of an exemplary two-strand chain hoist.

Referring to FIG. 1 of the drawings, a two-strand chain hoist 1 is shown as an exemplary application of the present invention. The chain hoist 1 has an approximately cuboid drive housing 2 in which an electric motor 3 in the form of an asynchronous motor is flange-mounted on a front side of the housing. Both the drive housing 2 and the motor 3 are provided with continuous cooling ribs, as can be seen in FIG. 1. On the side that is turned away from the drive housing 2, a cover 4 is provided on the motor 3. The cover contains the control or the key parts of the control. A chain sprocket housing 5 is located between the control cover 4 and the opposite front side of the drive housing. Brackets 6 protrude from the top side of the chain sprocket housing 5 for the purpose of hanging the chain hoist 1. A round link chain 7 leads away from the bottom of the chain sprocket housing 5 to a deflecting roller 8, which is supported in a hook housing 9 in such a way that it can rotate freely. A hook 10 is attached on the bottom side of the hook housing 9. After the deflection, the round link chain again leads upward to the chain sprocket housing 5, where its free end is anchored.

As one can be appreciated from FIG. 1, only a vertically directed force acts at any time in the two strands of the round link chain 7. The direction of the force is independent of whether a load hanging on the hook 10 is pulled upward or is simply prevented from falling downward. Even during downward movement, the force in the round link chain 7 acts in the same direction, and except for the initial movement, also with the same magnitude as during lifting.

Figure 2:
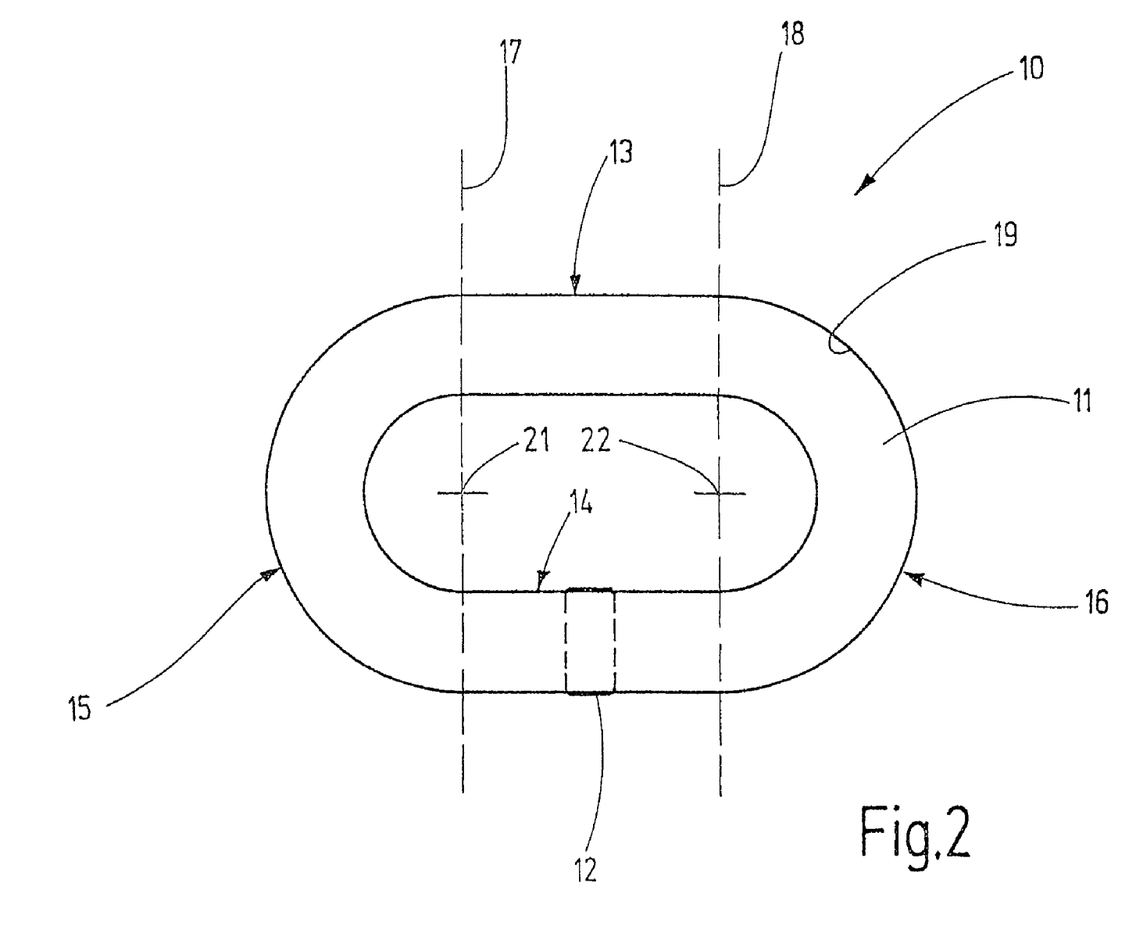
FIG. 2 is a plan view of a flank of an illustrative chain link.

The round link chain 7 consists of a plurality of identical chain links 11, of which one is shown as an example in FIG. 2. The chain link 11 consists of an ovally bent round wire section 12 with appropriate diameter. The wire section is butted at its ends and stub welded at 13. Due to the type of bending of the chain link, two mutually parallel sections 14 and 15 and two semicircular arcs 16 and 17 are formed. The semicircular arcs 16 and 17 transition at the dotted lines 18 and 19 into the straight sections 14 and 15. The external contour of the chain link 11 thus defines an outer line 20 that runs around the chain link. Because of this shape, the outer line 20 describes a semicircle in the area of the two semicircular arches 16 and 17. The center of the semicircle is on the dotted line 18 or 19 and is located in the middle between the two straight sections 14 and 15. The centers are marked 21 and 22 in FIG. 2. The adjacent chain links would stand with their flat sides vertical with respect to the plane of the drawing when interlinked with the illustrated chain link 11.

Figure 3:
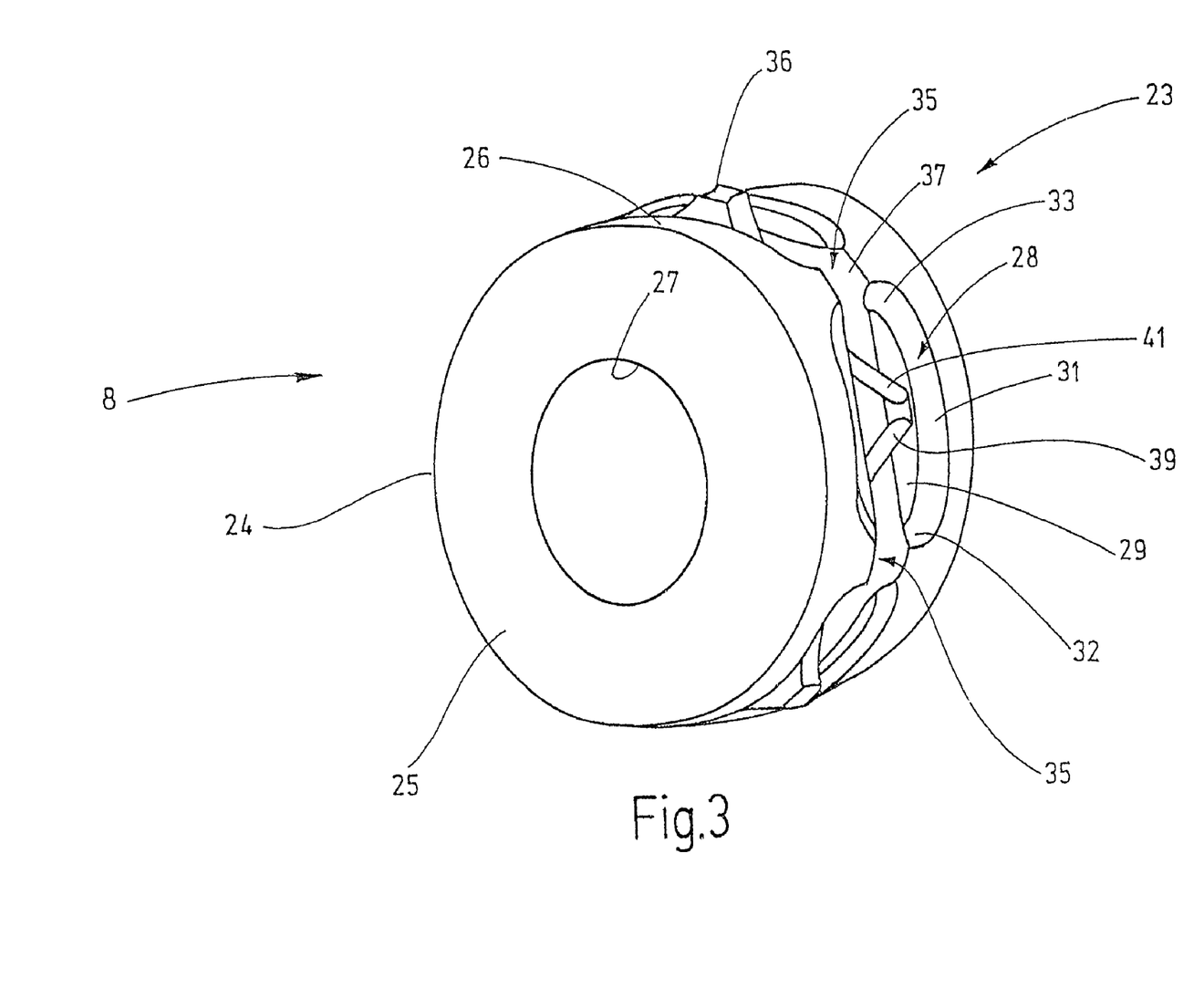
FIG. 3 is a perspective view of an illustrative deflecting roller according to the invention.
Figure 4:
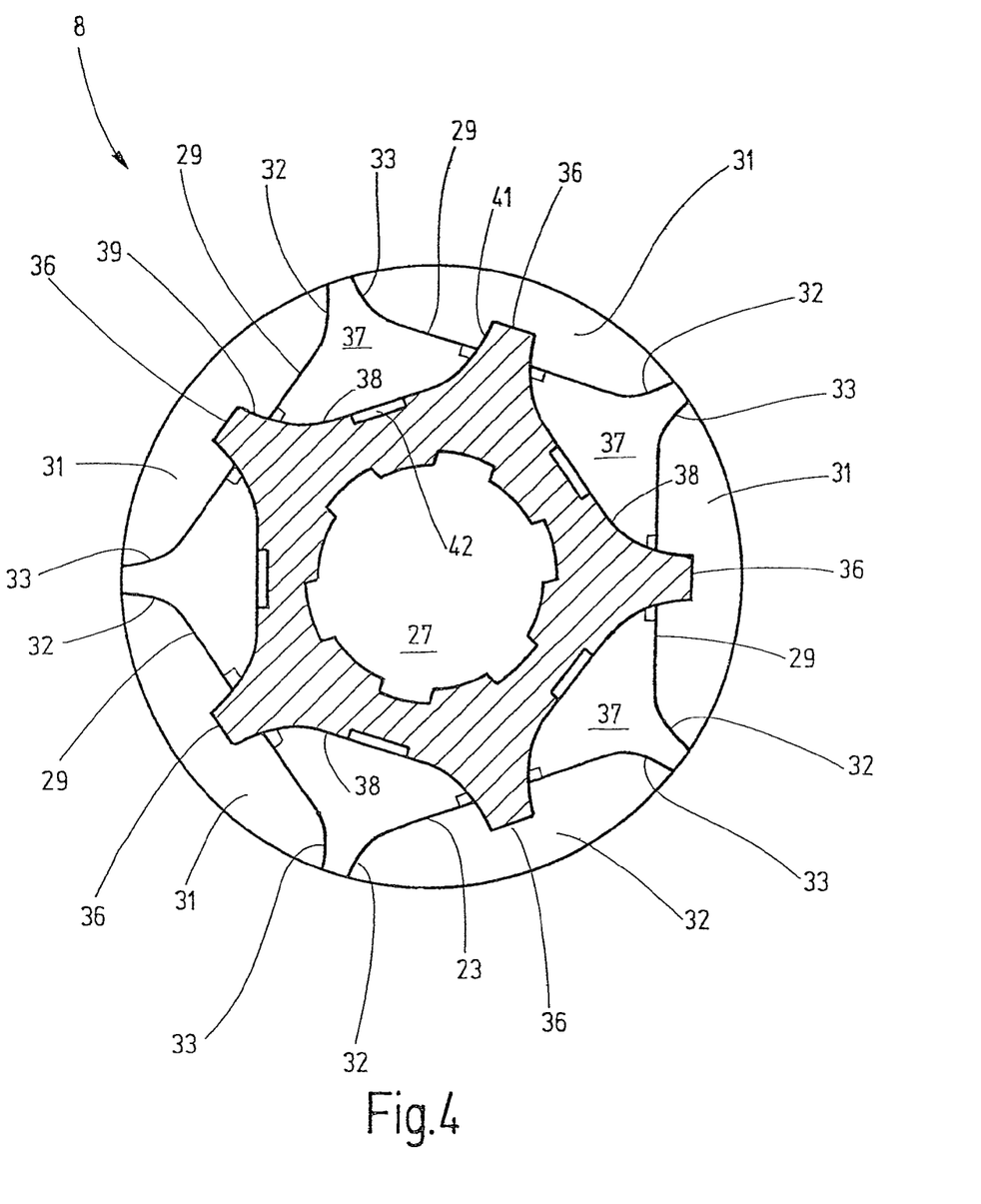
FIG. 4 is a cross-sectional of the deflecting roller of FIG. 3 taken along a symmetry plane of the chain pockets and perpendicular to the axis of rotation.

FIGS. 3 and 4 show a deflecting roller 8 as arranged in the hook housing 9. With the help of this deflecting roller 8, which works in cooperation with the round link chain 7, the force that originates from the hook 10 is introduced into the two strands of the chain 7 or the chain 7 is deflected. In this case, the standing chain links are subjected to a particular loading because the longitudinal forces do not engage with the longitudinal axis of the chain link 11, rather the points of action on the semicircular arches 16, 17 are shifted in the direction toward the two straight sections 14 or 15.

The deflecting roller 8 includes a base body 24 having shape of a short cylinder that is bound by two mutually parallel planar surfaces 25, only one of which can be seen in the drawing. A cylindrical peripheral surface 26 extends between the planar surfaces 25. A passage opening 27 is provided coaxially with respect to the peripheral surface 26 that traverses the deflecting roller 8 from one planar surface 25 to the other. The deflecting roller 8 is attached on an axle with the help of the opening 27.

In the illustrated embodiment, there are a total of four chain pockets 28 for the lying chain links arranged one after the other in the external peripheral surface 26. The chain pockets 28 are distributed equidistantly along the periphery and coaxially with respect to the passage opening 27. The separation of the chain pockets 28 from each other corresponds to the separation that would be assumed by the chain links 11 lying in the chain pockets 28 if the associated round link chain 7 is inserted in a taut state but without tension. A person skilled in the art will under the term lying chain links to refer to a chain link that is oriented in such a way that the flat side that faces a viewer of FIG. 2 points toward the rotation axis, i.e., the central axis of the perforation opening 27.

Each of the chain pockets 28 has an identical shape. The chain pockets 28 are tray-shaped and they are bound by a planar pocket bottom 29 and a wall 31. The wall 31 ends at the height of the external peripheral surface 26. The profile of the wall 31 corresponds to the profile of the outer line 20 of the chain link 11 located in it. Transverse to the peripheral direction, the wall 31 forms bearing or front surfaces 32 and 33 against which the respective chain link 11 can be applied with the external side of the circular arch 16 or 17 during loading. The pocket bottom 29 is planar in accordance with the planar flat side of the lying chain links 11.

Because of the crossed arrangement of the chain links of a round link chain, the two lying chain links with connecting chain links must necessarily be arranged so they stand, i.e., their flank surface, which is parallel to the plane of the drawing of FIG. 2, stands vertically on the axis of rotation of the deflecting roller 8. To accommodate the standing chain links 11, the deflecting roller 8 contains additional chain pockets 35 that correspond in number with the chain pockets 28 for the lying chain links. As can be seen in FIG. 3, the chain pockets 35 are arranged in such a way that they overlap in the peripheral direction with the chain pockets 28. Conceptually, the chain pockets 35 are composed of a groove running in the peripheral direction that has a width that corresponds to the thickness of the chain link 11. Teeth 36 protrude radially at appropriate separations out of the groove. Thus, the pockets 35 also have an approximately tray-shaped form and are bound by two mutually parallel flat side surfaces 37, of which only one can be seen in the FIGS. 3 and 4. The separation between the side surfaces 37 is slightly larger than the thickness of the chain link 11. The chain pockets 35 are further defined by a pocket bottom 38 and two tooth flank surfaces 39 and 41. According to the invention, the standing chain links should also be chambered or supported in the loading direction.

For completeness sake, it is also mentioned that recesses 42 can be provided in the pocket bottom 28 to receive the welding seam 13. Thus, the boundary of each chain pocket 35, with the exception of the recess 42, comprises the planar pocket bottom 38, which transitions smoothly at both ends into the tooth flanks 39 and 41. On both sides of the recess 42, the pocket bottom 38 forms straight sections, i.e., sections that lie on a tangent. Straight, in this case, does not necessarily also mean planar. The pocket bottom 38, just like the tooth flanks 39 and 41, can present a curvature with respect to an axis lying in the plane of the drawing of FIG. 4. In other words, the pocket bottom 38 can represent a hollow flute, whose radius of curvature is slightly larger than the radius of curvature of the wire from which the chain link 11 is manufactured.

Figure 5:
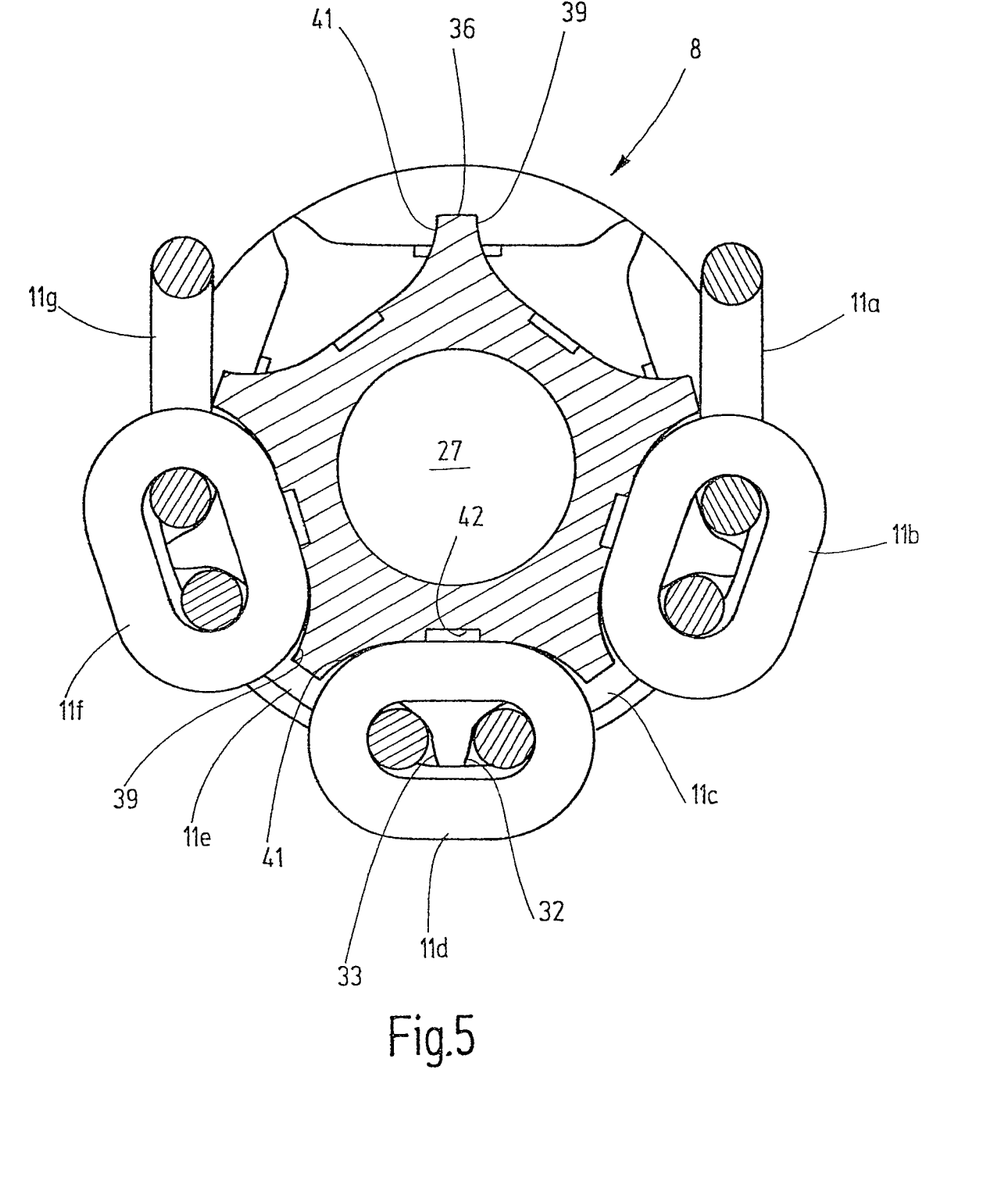
FIG. 5 is an enlarged, partial cross-sectional view of the deflecting roller of FIG. 3 taken in a plane perpendicular to the axis of rotation showing the interplay between the round link chain and the deflecting roller according to the invention with a chain not under a load.

The cooperation of the round link chain 7 with the deflecting roller 8 is shown in FIG. 5. The symmetry plane of the chain pockets 28, which stands vertically on the rotation axis of the deflecting roller 8, is the same as the symmetry plane of the chain pockets 35 and also the symmetry plane of the chain links 11 when the chain links lie in the chain pockets 28 or 35. FIG. 5 shows the deflecting roller 8 in cross section along this symmetry plane, as illustrated in FIG. 4. The lying chain links 11 are also sectioned in this symmetry plane, i.e., in a plane that stands vertically on the plane of the drawing of FIG. 2 and passes through the centers 21 and 22.

In FIG. 5, the chain links are marked with the reference characters 11 and additionally with a small letter, to allow easier distinction from each other. The description given in connection with FIG. 2 applies to all of the chain links. As shown in FIG. 5, the round link chain runs off upward, on the right and on the left, tangentially from the deflecting roller 8. It is unimportant for further consideration of the invention which strand leads to the load or anchor and which strand is connected to the driving chain sprocket. The conditions as far as the invention is concerned are symmetric. In the illustrated position, maximum loading of the standing chain link 11d occurs. The chain link 11d lies on the vertex of the chain path.

Figure 6:
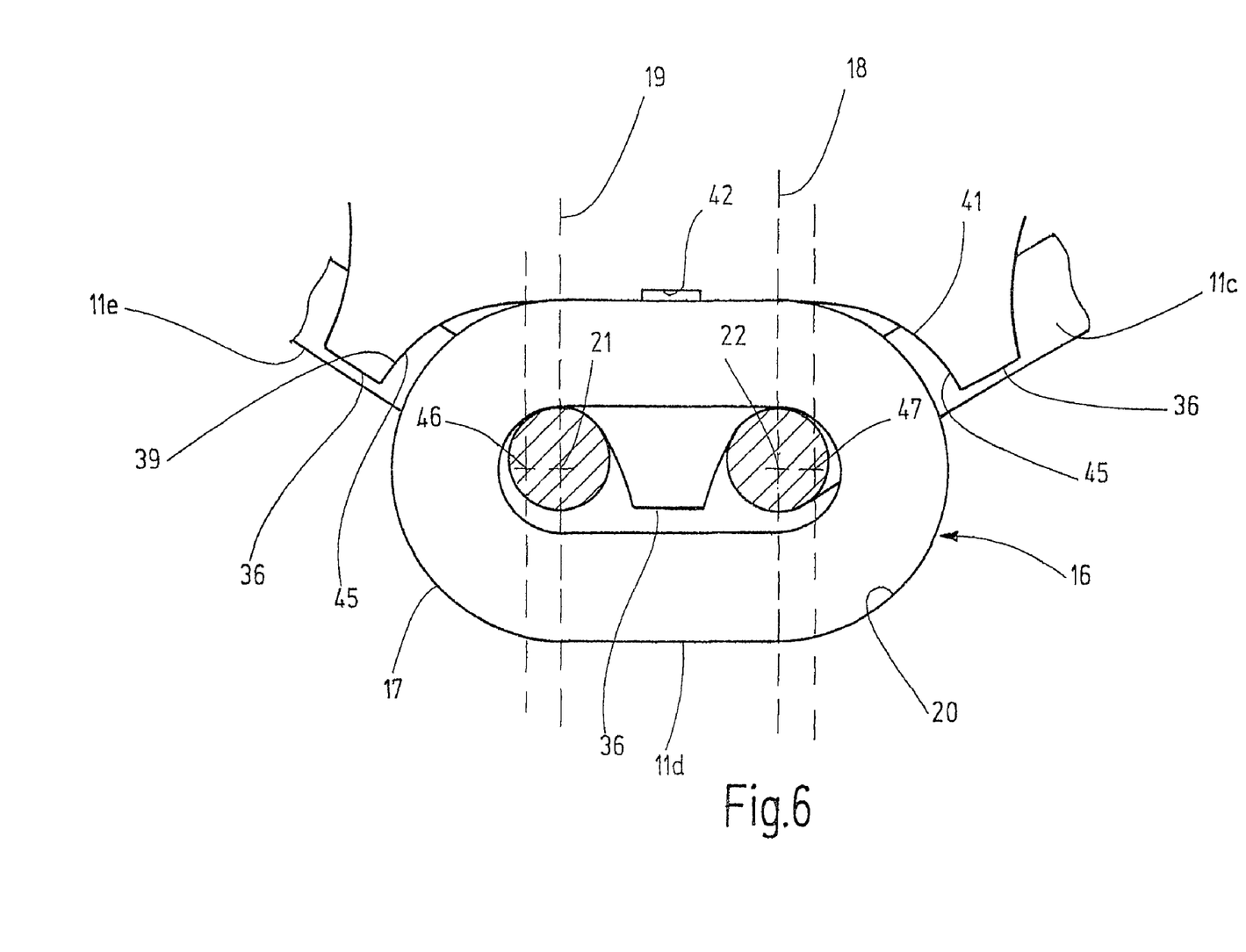
FIG. 6 is a further enlarged portion of the cross-sectional view of FIG. 5.

FIG. 6 provides an enlarged detail representation of the engagement interconnections between the nose of a standing chain link, for example, of the chain link 11d, and the tooth flank 39 of the adjacent tooth 36. Any details that are not necessary for an understanding of the engagement conditions are omitted from FIG. 6. In addition, the size ratios are greatly exaggerated in order to show the key features. The cross section through the deflecting roller 8 lies in the symmetry plane, which stands vertically on the axis of rotation of the deflecting roller. It is the above-mentioned symmetry plane that runs in the center between the two side surfaces 37 of the chain pocket 35. Thus, it also runs in the center between the two mutually parallel flank surfaces of the chain link 11d, with the exception of the tilting free play. These surfaces are defined by the tangential planes that run the chain link 11d on both sides parallel to the plane of the drawing according to FIG. 2 or 6. In these recognizable cutting planes, the load receiving flank surface 39 forms a tooth flank curvature line 45 that directly faces the outer line or outer contour line 20 in the peripheral direction (again with the exception of the tilting free play).

Figure 8:
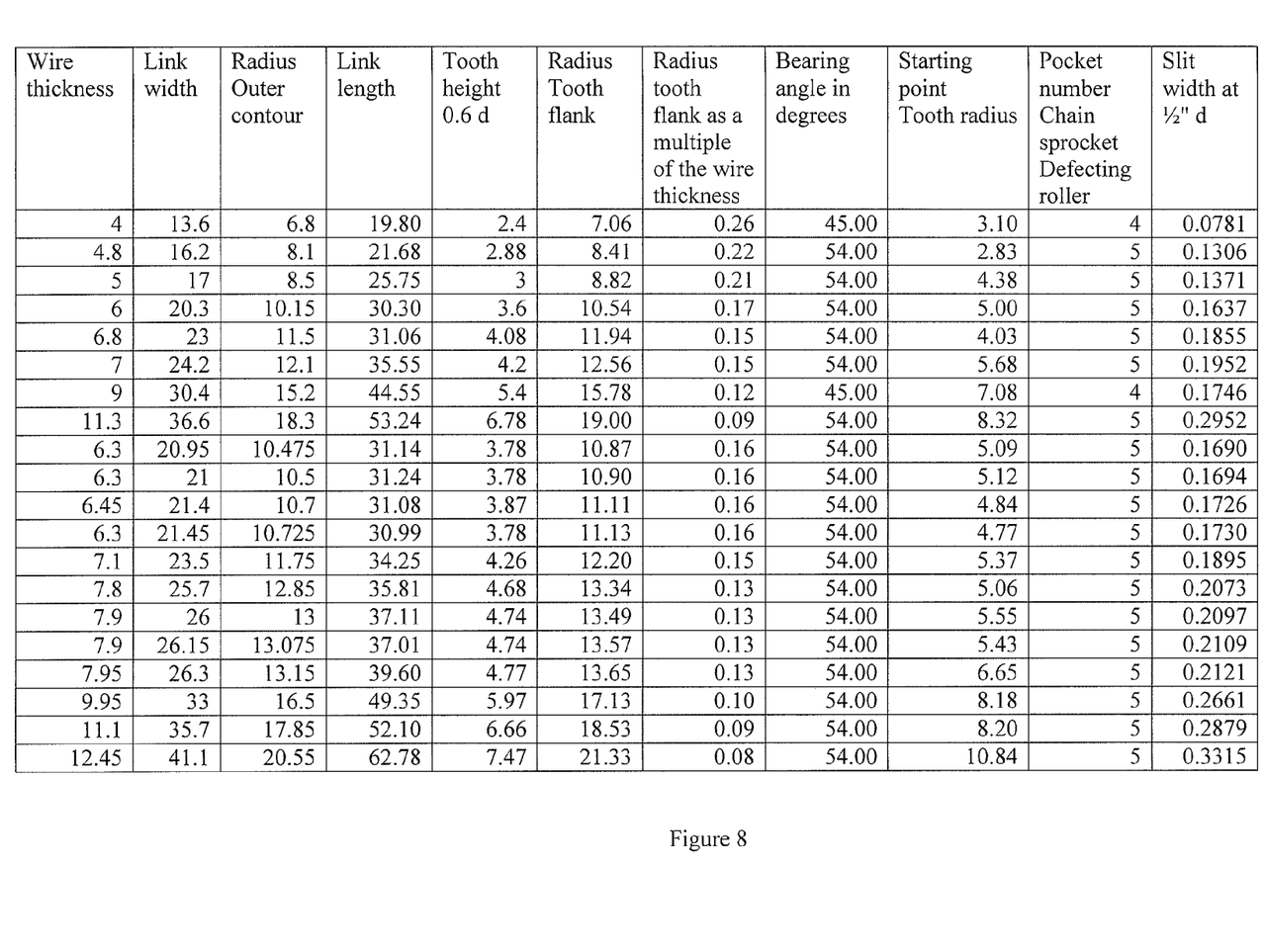
FIG. 8 is a table showing advantageous dimensions for a deflecting roller according to the invention as a function of the chain parameters.

The tooth flank curvature line 45 is a circular arc, which extends to the tip of the adjacent tooth 36, and opens tangentially into the pocket bottom 38. The center of this circle that defines the tooth flank curvature line 45 is located at 46, i.e., the center 46 is located opposite the center 21 in the loading direction for some distance parallel to the pocket bottom 38. The extent of the shift, i.e., the separation between the two centers 21 and 46 is a function of the dimensions of the chain link 11. In the table of FIG. 8, advantageous values are indicated for the separation a between the centers as a function of the dimensions of the chain link 11. The diameter of the circle, which is described by the tooth flank curvature line, has the same diameter as the semicircular arc 16, 17.

The tooth flank 41 is designed in the same way, and therefore the same reference character 45 is used for the tooth flank curvature line. The tooth flank curvature line 45 of the tooth flank 41 of the facing tooth 36 is also a circular arc that defines a center 47. The center 47 is at the same separation from the center 22, by the measure a, as the separation between the centers 21 and 46 when the chain link 11d lies centered between the chain links 11c and 11e.

In determining this separation a, it is assumed that the round link chain has not been used and presents no signs of wear. The round link chain lies, without being forced, over the deflecting roller 8, i.e., the lying chain links 11c and 11e lie symmetrically in their chain pockets 28. The standing chain link 11d is in turn symmetrically inserted between the lying chain links, producing in this way the position of the center 21 as the curvature center of the outer contour line 20.

As shown in the table of FIG. 8, the wedge shape that results from the shift in the centers of the two adjacent circles in each case is very small. In the end, it is dimensioned so that when the chain is loaded with a nominal load in the situation as shown in FIG. 5, the standing chain link 11d lying on the vertex is pulled by the flat lying chain links 11c and 11e lengthwise under simultaneous elastic deformation. Due to this deformation, the standing chain link 11d with its nose, i.e., the part of the semicircular arc that points in the loading direction, will be applied against the tooth flank 39. That is to say, above this load value, the force originating from the lying chain link 11e is transmitted additionally via the deflecting roller to the lying chain link 11c. The base body 24 of the deflecting roller 8 lies effectively in the bypass to the chain link 11d.

It has been found that, for chains of identical quality, the disclosed configuration can allow the chain to be used with higher loads. A load increase of up to 25% is possible as compared to the nominal load that would apply otherwise. Furthermore, it has been found that the deflecting roller of the invention can improve safety and undergo less wear.

In the preceding description, it was assumed that the chain 8 is a round link chain, where the individual chain links are manufactured from a piece of round wire. Thus, it is advantageous for the tooth flanks 39 and 41 to be curved biaxially. This means that they are curved along the osculating circle and the generating line for the load receiving tooth flank surfaces 39 and 41 is a circular arc with a diameter that is slightly larger than the diameter of the wire from which the round link chain is manufactured. The magnitude of the surface pressure is thus reduced. The same can be done in the area of the pocket bottom.

In the interest of increasing the bearing load of the link chain, efforts are ongoing to use a profiled wire instead of round wire for the manufacture of the chain links. The profiled wire consists of a circular arch section and a section of a square. In other words, it has a square cross section, where, on one side, the adjacent corners are replaced by quarters of a circle. The design of the load receiving tooth flank 39 according to the invention also can be used with this type of chain. The load receiving surface 39 is then no longer curved biaxially, as mentioned above in connection with the round link chain; rather, the generating line for the surface is a straight line that is led along the tooth flank curvature line in parallel to the axis of rotation.

Finally, untreated steel of sufficient strength, which has not been subjected secondarily to a heat treatment, can be used for the deflecting roller. In this way, the costs can be clearly lowered.

The illustrated deflecting roller is provided with bores for mounting on a shaft. The deflecting roller also can be designed with an integral projecting shaft.

Depending on the situation, it can be advantageous for the radius of the tooth flank curvature line 45 to be greater than the radius of the outer contour line 20. The center 46 or 47 in this case, is shifted further upward with respect to the drawings. The size of the shift ensures that the tooth flank curvature line 45 continues to open tangentially into the pocket bottom 38.

Figure 7:
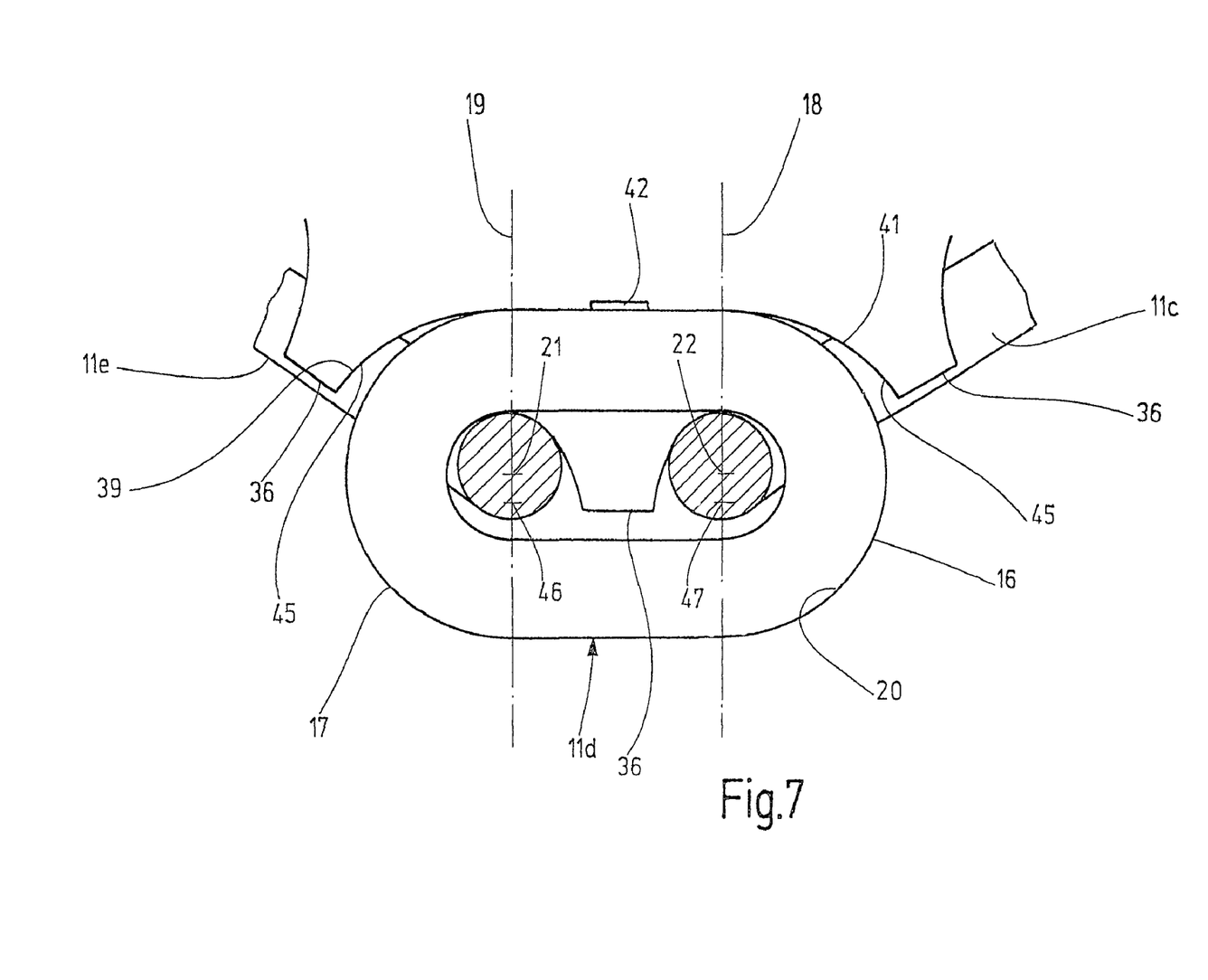
FIG. 7 is similar to FIG. 6 but showing a different configuration for the curvature line of the tooth flank curvature line.

FIG. 7 illustrates an additional embodiment of the invention. In this embodiment, the required separation between the outer contour line 20 of the chain link 11d and the adjacent tooth flank 39 or 41 is not achieved by a shifting of the osculating circle as in the embodiment of FIG. 6. Rather, the separation is produced by the tooth flank curvature line 45 defining an osculating circle, whose radius is increased, for example, according to Table 8, in comparison to the radius of the outer contour line 20 in the area of the semicircular arcs.

Since inflexion points must be avoided in the area of the chain pocket 35, which otherwise could lead to impressions on the external side of the chain link 11, the center 46 on the separating straight line 17 or 18 is shifted away from the pocket bottom 38. As a result, the pocket bottom 38 opens directly tangentially with its straight section, and thus without inflexion, into the tooth flank curvature line 45. The centers 21 and 46 thus lie on the separation straight line 17 that separates the semicircular arch 1 from the straight sections 12, 13, while the curvature center 47 lies on the separation straight line 18 that separates the straight section 13, 14 from the semicircular arc 16. The separation between the centers 21, 46 or 22, 47 from each other corresponds to the difference in radius. In other respects, the operation is as described above.

Finally, it is also conceivable to dimension the tooth flank line of curvature not as a circular arc section, but to give it a shape that the outer contour line 20 assumes in this area under load. In this case as well, osculating circles can be defined both for the tooth flank line of curvature 45 and also for the outer contour line 20, which are mutually shifted according to FIG. 6 and the above table. These osculating circles represent approximation curves, which can be determined, for example, by a type of regression analysis based on least error squares. The separation measurement and the adaptation to the osculating circle in this case occurs starting from the radius of the given imaginary circle. The table is calculated and tested based on a load of 160 N/mm$^2$.

The height of each tooth 36 is subject to the conflicting priorities of good running properties of the chain 8 and maximization of the rotation path along which the force between the deflecting roller and the standing chain link will be transmitted. Advantageous values for the height of the tooth 36 are between 0.16 times and 0.75 times the thickness of the wire from which the chain link 10 is manufactured. The height is measured as the separation between a plane and the tooth tip. The reference plane is the tangential plane on the lower flank surface of the lying chain link, through which the tooth 36 penetrates. The run-on and run-off conditions can be improved if the tooth 36 is provided at its tooth tip with a chamfer. The height or width of the chamfer is between 0.1 and 1.5 mm.

A deflecting roller for link chains, for example, round link chains or profiled steel chains, has been described that provides chain pockets for lying chain links on the circumference. Furthermore, chain pockets for standing chain links are provided. The chain pockets for the standing chain links are separated from each other by teeth. The tooth flank surfaces of the teeth, against which a standing chain link bears under the action of a load, are dimensioned and profiled in a specific way. The dimensioning is such that, up to a certain chain loading, the standing chain link does not bear with its nose against the tooth flank. A contact between the tooth flank surface and the nose of the corresponding standing chain link concerned occurs only above a defined chain load.

The invention claimed is:

1. A deflecting roller for deflecting a link chain in which each chain link comprises a bent wire and has a planar shape including two mutually parallel sections and two semicircular arcs, the deflecting roller comprising:

a base body having an external peripheral surface and an axis of rotation;

a plurality of first chain pockets located on the external peripheral surface for receiving lying chain links of the link chain and for transmitting force from the deflecting roller to the lying chain links;

a plurality of second chain pockets located on the external peripheral surface receiving standing chain links of the link chain, the second chain pockets corresponding in number to the first chain pockets for the lying chain links, each second chain pocket having support areas for the standing chain links and against which at least a part of one of the parallel sections of the respective standing chain link can bear;

each second chain pocket being arranged between and overlapping adjacent first chain pockets for the lying chain links;

a plurality of teeth with each being arranged between two adjacent second chain pockets for the standing chain links and such that the tooth bounds the standing chain link, each tooth being defined by two tooth flanks that face in a peripheral direction of the base body;

where each of the two tooth flanks of the adjacent teeth that delimit a chain pocket defines in symmetry planes that stand vertically on the rotation axis of the second chain pockets for the standing chain links a tooth flank line of curvature that approximately corresponds to a curved profile of an outer line of the adjacent semicircular arc that points in a load direction of a standing chain link arranged in the respective second chain pocket; and wherein the two tooth flanks are positioned so that their tooth flank line of curvature line measured in the symmetry plane is separated at least in an area of a tip of the tooth from the outer line of the semicircular arc of a standing chain link located in the respective chain pocket pointing in the load direction if the two adjacent line chain links are centered and lie without being influenced of an external force in their respective chain pockets and there is no free play between the chain links.

2. The deflecting roller according to claim 1, wherein each tooth has a height of between 0.16 times and 0.75 times a thickness of a chain link over a surface that is defined by a flank surface of a lying chain link adjacent to the rotation axis.

3. The deflecting roller according to claim 1, wherein the tooth flank is curved biaxially.

4. The deflecting roller according to claim 3, wherein the tooth flank ha another curvature having a radius that is not smaller than half a diameter of the wire of the chain link.

5. The deflecting roller according to claim 1, wherein the outer line of the semicircular arc of a standing chain link that has been inserted in the deflecting roller defines a chain link osculating circle with a first center and the line of curvature line of the tooth flank defines a tooth flank osculating circle with a second center, and wherein the second center of each tooth flank osculating circle is shifted with respect to the first center of the adjacent chain link osculating circle.

6. The deflecting roller according to claim 5, wherein the shift is in the loading direction.

7. The deflecting roller according to claim 5, wherein a connecting straight line between the first and second centers extends parallel to the parallel sections of the standing chain link.

8. The deflecting roller according to claim 5, wherein a connecting straight line between the first and second centers extends at an acute angle with respect to longitudinal axes of the parallel sections of the standing chain link.

9. The deflecting roller according to claim 5, wherein a connecting straight line between the first and second centers extends at a right angle with respect to longitudinal axes of the parallel sections of the standing chain link.

10. The deflecting roller according to claim 5, wherein a distance between the first and second centers of the osculating circles is between 0.06 times and 0.1 times a diameter of the wire of the chain link.

11. The deflecting roller according to claim 1, wherein the tooth flank line of curvature is exactly circular.

12. The deflecting roller according to claim 1, wherein the tooth flank line of curvature line has a profile the same as the outer line of the semicircular arc of a chain link that is under a nominal load and is adjacent to the tooth flank.

13. The deflecting roller according to claim 1, wherein the deflecting roller is made from hardened steel.

14. The deflecting roller according to claim 1, wherein the base body includes an axial bore for receiving a shaft.

15. The deflecting roller according to claim 1, wherein the first chain pockets each have a tray shape.

16. The deflecting roller according to claim 1, wherein the second chain pockets for the standing chain links are defined by two facing tooth flanks and a pocket bottom.

17. The deflecting roller according to claim 16, wherein the pocket bottom is curved and has an axis of curvature forming a right angle with the axis of rotation.

18. The deflecting roller according to claim 16, wherein the pocket bottom is planar.

19. The deflecting roller according to claim 16, wherein the pocket bottom has a center recess for relieving a welding seam of the chain link.

20. The deflecting roller according to claim 1, wherein a first radius of the osculating circle of the tooth flank line of curvature is greater than a second radius of the osculating circle of the outer line of the semicircular arc.

21. The deflecting roller according to claim 20, wherein the ratio of the first and second radii is between 1.0 and 1.2.

22. The deflecting roller according to claim 20, wherein the ratio of the first and second radii is between 0.08 times and 0.3 times a diameter of the wire.

23. The deflecting roller according to claim 1, wherein the tooth flank transitions in a direction toward the tip of the tooth into a chamfered surface.

24. The deflecting roller according to claim 23, wherein a height of the chamfered surface is 0.1-1.5 mm.

25. The deflecting roller according to claim 1, wherein the deflecting roller has an integral axle journal.

26. The deflecting roller according to claim 1, wherein, in an area that protrudes radially over a pocket bottom for a lying chain link, the teeth have a width that is only slightly smaller than a distance between the parallel sections of the chain link.

27. The deflecting roller according to claim 1, wherein at a predetermined tension load of between 100% and 75% of a nominal tension of the link chain the distance between the tooth flank line of curvature and the outer line of the semicircular arc reaches zero.

28. The deflecting roller according to claim 27, wherein the nominal tension is between 320 N/mm$^2$ and 80 N/mm$^2$.

29. The deflecting roller according to claim 27, wherein the nominal tension is based on a nominal loading capacity of a chain drive and a cross-sectional area of the wire of the chain link.

* * * * *